Feb. 8, 1955
W. M. HOULDSWORTH
2,701,534
DEVICE FOR TRIMMING AND CRIMPING PIE CRUSTS
Filed Sept. 5, 1950
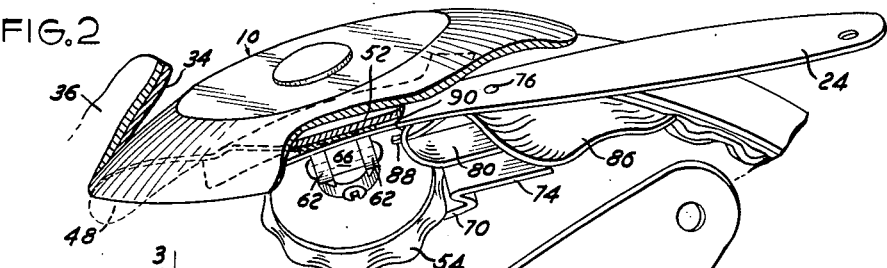
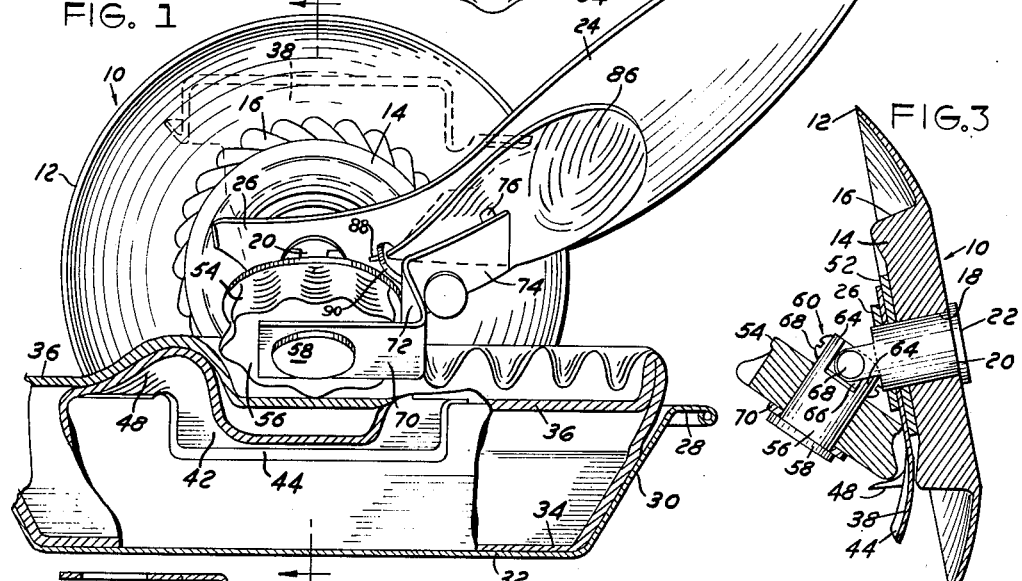
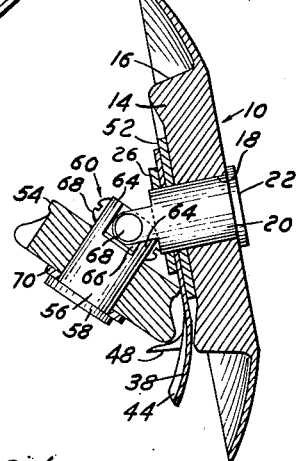
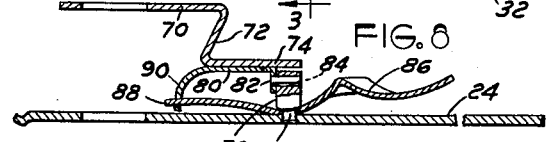
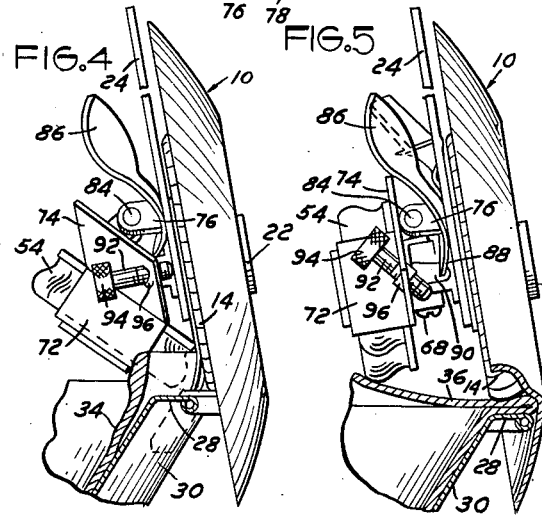
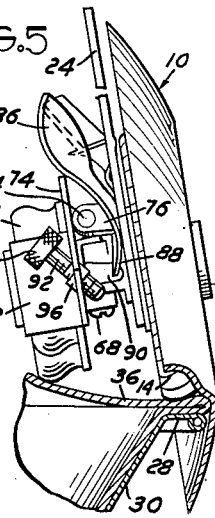
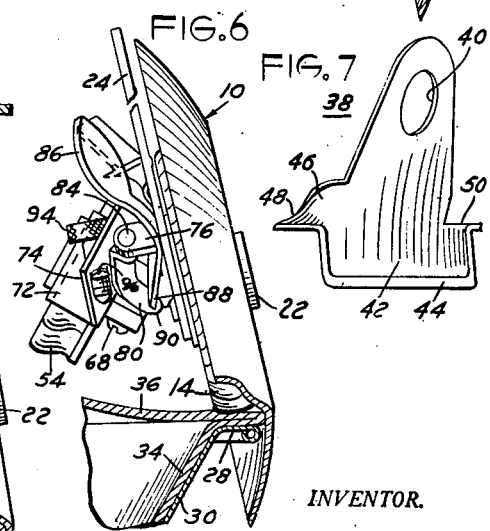
INVENTOR.
Wallace M. Houldsworth United States Patent Office 2,701,534
Patented Feb. 8, 1955

2,701,534

DEVICE FOR TRIMMING AND CRIMPING PIE CRUSTS

Wallace M. Houldsworth, Royal Oak, Mich.

Application September 5, 1950, Serial No. 183,227

5 Claims. (Cl. 107—49)

This invention relates to devices for expediting the making of pies and the like and particularly to a device for trimming and crimping pie crusts. This invention constitutes an improvement over that described and illustrated in my copending application for U. S. patent, Serial No. 130,949 filed December 3, 1949.

An important object of the invention is to provide an improved implement for trimming and crimping pie crusts which is adapted to travel around the rim of a pie pan and while so doing sever the excess amount of crust material, crimp the remaining edge of the pie crust and free the edge of the pie crust from the pan in order to facilitate removal of the pie after it is baked. Another important object of the invention is to provide an improved device of this character which is so constructed that it is readily capable of adjustment by the operator for crimping pie crusts of different thicknesses and which enables the crimping part of the device to be cleared out of the way at the convenience of the operator. A further important object of the invention is to provide a device of this character including a handle for holding the same in the hand of the operator and means associated with the handle which enables the operator to control the crimping operation while the device is moved around a pie pan.

In carrying out the invention, the device includes a rotatable trimming wheel which is shaped to roll around the rim of a pie pan and sever excess material from the edge of the pie crust and further includes a crimping wheel bodily movably supported on the device and capable of adjustment to vary its action on the pie crust. Associated with the device and moving with the two wheels is a member which enters between the pie crust and the side of the pan and functions to raise the trimmed edge of the crust into a substantially vertical position relatively free of the pan. This member cooperates with the crimping wheel to compress or pinch the raised edge of the crust therebetween. An important feature of the invention is the control of the crimping wheel from the handle portion of the device which enables the operator to adjust the spacing of the crimping wheel relative to the trimming wheel to vary its action on the crust. Another important feature of the invention is the construction and design of the parts of the device which enables them to be economically manufactured and assembled at low cost.

All of the foregoing and still further objects and advantages of the invention will become more fully apparent from a study of the specification, taken in connection with the drawings, wherein:

Fig. 1 is a side view, partly in section, of a device constructed in accordance with this invention and showing the use thereof upon the crust of a pie contained in a conventional pie pan, Fig. 2 is a top plan view of the device of Fig. 1, the trimming wheel being partly broken away in section for purpose of clarity, and showing the operation of the device on the rim of a pie pan, Fig. 3 is a vertical cross sectional view taken along the line 3—3 of Fig. 1, Fig. 4 is an end view of the device showing the same on the rim of a pie pan and with the parts of the device in the operating position assumed in Figs. 1 and 2, Figs. 5 and 6 are end views of the device showing an optional operating position of the device on the rim of a pie pan and showing two different positions of the crimping wheel, Fig. 7 is a perspective view of one member of the assembly, and Fig. 8 is a fragmentary sectional view illustrating the handle control for the crimping wheel.

Referring particularly to the drawings, the illustrated embodiment of the invention includes a trimming wheel generally indicated at 10 having a concave or saucer shaped formation. The periphery of the wheel is tapered to form a cutting edge 12 therearound. Carried by the wheel 10 and preferably forming an integral part thereof is an inwardly projecting circularly shaped boss 14. The boss is of less diameter than the wheel and has its periphery 16 shaped with any desired marking configuration, such as the fluted design shown in Fig. 1, and in use the boss 14 bears on the rim of a pie pan and when rolled therearound causes the cutting edge of the wheel 10 to sever excess crust material overhanging the edge of the rim. The wheel 10 is provided with an axial bore 18 through which extends a stub shaft 20. The wheel 10 is fixed to the shaft 20 for joint rotation therewith, the latter having a head 22 serving as an abutment to prevent the wheel from detachment.

A handle is provided for guiding the trimming wheel 10 around the edge of the pie pan. The handle consists in the main of a stock or shank 24 which may extend relatively straight, as shown in Fig. 2. The forward end of the handle is indicated at 26 and is provided with a hole through which the stub shaft 20 extends, as shown in Fig. 3.

In use, as shown particularly in Fig. 3, the shaft 20 projects inwardly beyond the trimming wheel and the axis of the shaft usually assumes the upward inclination shown in Fig. 3. As illustrated in Figs. 4, 5 and 6, the circular boss 14 of the trimming wheel bears upon the rim 28 of a conventional pie pan including the side wall 30 and the bottom 32. The bottom crust of a pie contained in the pie pan is shown at 34 and, as in conventional practice, extends up the side of the pan and prior to the trimming operation laps over the rim 28 in the manner shown at the left of Fig. 2. The top crust of a pie contained within the pan is indicated at 36 and, as in conventional practice, the edge of the pie crust overlies the rim of the pan in superimposed relation to the bottom crust 34.

Carried by the wheel 10 is an assembly of elements which as the device is rolled around the pie pan lifts the two edges 34 and 36 of the pie crust and raises them above the rim 28 to free the bottom crust therefrom. While so raised these elements pinch the two edges of the crusts together in sealing relationship and at the same time impart an ornamental crimp thereto, as shown by a comparison of the left and right hand portions of Fig. 1. For this purpose there is provided a substantially vertically extending floating plate, generally indicated at 38 in Fig. 7, which depends downwardly from the shaft so that it may enter between the bottom crust 34 and the side wall 30 of the pie pan. The floating plate is preferably formed out of flat sheet metal material and is provided in the upper end thereof with a hole 40 for receiving the stub shaft 20 in mounted position. In its assembled position in the device the floating plate 38 is mounted on the shaft 20 between the handle and the trimming wheel 10, as shown best in Fig. 3. In order to conform to the circular character of the side wall 30 of the pie pan, the floating plate 38 is preferably formed with a slight transverse curvature, as shown in Fig. 3.

The floating plate is provided with a lower section 42 which is formed to bring a light spring pressure against the inside surface of the side wall 30 of the pie pan and extend between the same and the side wall portion of the bottom pie crust 34. The lower edge of the bottom section 42 may be tapered, as indicated at 44, to avoid cutting or tearing the crust. The floating plate is provided with a finger 46 projecting forwardly from the leading edge of the plate. The finger 46 is provided with a quarter twist to give it a flat horizontally extending ledge 48 which in one operating position rests on the rim 28 of the pie pan near the peripheral portion of the cutting edge 12 performing the trimming operation, as shown in Fig. 1, and in dotted outline in Fig. 2. As the device is moved around on the pie pan the cutting edge 12 of the wheel severs the excess crust material, and the finger sliding beneath said crust causes it to slide up the contour of said finger to the vertical position shown in Fig. 1. To balance the action of the floating plate 38 and to guide it in its movement around the pie pan, it is preferred to provide a rear ledge 50 to prevent rotation of plate 38 when the device is propelled rearwardly, but allowing clearance between the rim 28 of the pie pan, and said ledge 50 when the device is propelled forward, thus eliminating friction thereof. The handle may be formed along its top edge to hold the floating plate in an inverted position as shown in Fig. 1 in dotted outline.

A thrust washer 52 may be used between the floating plate 38 and the wheel 10 to eliminate friction, as it is believed that after assembly there will be an outward thrust created between the wheels. In this manner, the assembly is held between the heads 22 and 58 of the shafts, as best shown in Fig. 3.

Carried by the trimming wheel on the inside thereof is a crimping wheel 54 which is capable of bodily swingable movement as hereinafter described. The crimping wheel is fixed upon a stub shaft 56 similar to stub shaft 20 and is provided with a head 58 shown in Fig. 3. The two stub shafts 20 and 56 are connected together by a universal joint generally indicated at 60 which enables the crimping wheel to be inclined at various angles with respect to the trimming wheel. As shown, each stub shaft is bifurcated on its inner end to provide two spaced sections or legs. The leg portions of the stub shaft 20 are shown in Fig. 2 at 62—62. The leg portions of the stub shaft 56 are shown in Fig. 3 at 64—64. Positioned between the overlapping leg sections of the two stub shafts is a body 66 of rectangular formation to which are secured threaded members 68 which pass through the leg sections of the two stub shafts and enter the body. In this manner the two stub shafts are coupled together yet one may swing bodily with respect to the other to vary the angular relationship of the two wheels.

Control means is provided for varying the inclination of the crimping wheel 54 from the handle 24. For this purpose there is provided a back plate 70 which is journally secured to the stub shaft 56 between the crimping wheel 54 and the head 58. The plate 70 is provided with a jogged intermediate section 72 which passes along side of the crimping wheel and an outer end section 74 which extends generally parallel to but in spaced relation to the handle 24. The plate is pivoted to swing with the crimping wheel and for this purpose a mounting is provided on the handle opposite to the end section 74 of the plate. As best shown in Figs. 4, 5, 6 and 8, a stud 76 is provided which projects outwardly from the handle toward the plate section 74. The base end of the stud is reduced to form a cylindrically shaped extension 78 which passes through and is secured in a round hole in the handle and is headed on its extremity as shown in Fig. 8 to hold the stud on the handle. The major balance of the stud is flat sided and has a width in one lateral dimension greater than the cylindrical extension 78. Carried by the plate section 74 and mounted on the inner side thereof is a bracket plate 80. One end section 82 of the plate is turned inwardly in overlapping relation to the stud 76 and a pin 84 pivotally connects the two together. The pivot pin is so related to the universal joint 60 that a projection of its axis will pass therethrough. In this manner the back plate 70—74 and the crimping wheel are coupled together for joint swingable movement, as shown by a comparison of these parts in Figs. 4, 5 and 6.

The swinging movement of the crimping wheel is controlled from the handle by means of a finger engaging member 86. This member is wider at its outer end and may have a concave depression therein as shown for receiving the thumb of the hand which grasps the handle. The opposite end of the member tapers to a substantially rod shaped extremity as shown at 88 in Figs. 1 and 2. The control member 86 is positioned between the handle 24 and the plate section 74 and is provided with a hole intermediate its ends through which the cylindrical end 78 of the stud 76 extends as shown in Fig. 8. In this manner the control member is capable of reciprocal swinging movement about the axis of the stud.

To transfer the control movements of the thumb engaging member to the back plate 70—74 and the crimping wheel 54, the inner tapered end 88 of the control member is connected to the opposite end section 90 of the bracket 80. This is accomplished by curving the end section 90 inwardly, as best shown in Figs. 2 and 6, and providing a hole in its extremity through which the tapered end 88 of the control member 86 extends. The hole is slightly oversize the rod-like end 88 to provide a loose fit. In this manner any reciprocal swinging movement of the control member about the stud axis will be transmitted to the back plate 70 causing the latter and the crimping wheel to tilt at various angles with respect to the plane of the trimming wheel 10.

When swung downwardly to a position like that shown in Fig. 4, the crimping wheel 54 cooperates with the floating plate 38 to compress or pinch the raised edge of the pie crust. When both the top and bottom edges of the crust layers 34 and 36 are raised and received between the floating plate and the crimping wheel, the compressive action of these elements on the crust edges will pinch and seal them together in the manner shown at the right of Fig. 1. The peripheral surface of the crimping wheel may be circularly corrugated as shown and result in the formation of a series of alternate hills and valleys on the crust edges. The peripheral edge of the crimping wheel may be shaped with any suitable design to indentably mark the raised pinched edges of the crusts.

Figs. 4, 5 and 6 show three positions of the crimping wheel and the plate 70. In Fig. 4 the thumb engaging end of the control member 86 has been shifted to approximately its lowest position thereby bringing the lower peripheral portion of the crimping wheel in close approximation to the floating plate between which the raised edge of the pie is compressed and pinched. When the thumb engaging end of the control member is lifted, its opposite tapered end 88 is depressed causing the plate 70 and the crimping wheel to swing bodily upwardly. Figs. 5 and 6 show an optional use of the device wherein the plate member 38 is swung 180° to the inverted position shown in dotted outline in Fig. 1 and the boss 14 of the trimming wheel 10 rides over the crust material overlying the pie pan rim. Fig. 5 shows an intermediate position of the movable parts in which the planes of the two wheels 10 and 54 extend approximately parallel to one another. In this position the crimping wheel may be used to indent the upper crust 36 of the pie in circularly spaced relation to its trimmed edge. In Fig. 6 the thumb engaging end of the control member has been lifted approximately to its maximum heighth, in which position the crimping wheel has been swung upwardly clear of the crust and out of its operating position. In this position the cutting edge 12 of the trimming wheel 10 severs the excess crust material while its circular boss rolls over the severed edges of the crusts lying on the rim 28 marking and sealing them together as shown in Fig. 6.

Means is provided for adjustably holding the crimping at the desired angular relationship to the plane of the trimming wheel 10 and the floating plate 38. Such means is shown in the illustrated embodiment of the invention in the form of a threaded member 92 extending through the outer end section 74 of the back plate 70 in spaced relation below the thumb control member 86. Member 92 is so mounted that threaded adjustment thereof will project or retract its inner end with respect to the plate section 74. The outer end of the member is provided with a knurled head 94 to facilitate such adjustment. In use, as shown in Fig. 4, the inner end of the threaded member abuts the handle and serves as a stop limiting further downward swinging movement of the crimping wheel toward the floating plate. It is evident that threaded adjustment of the member 92 will vary the minimum distance separating the periphery of the crimping wheel 54 from the inside face of the floating plate, thereby vary the crimping action of the plate and wheel on the raised crust edges therebetween.

The adjustable member 92 may be mounted in any suitable way for threaded advancement and retraction. As shown, the end section 74 of the back plate is provided with semi-circular struck-out portions 96—96 on opposite sides thereof which diametrically oppose one another around the hole through which the member extends. These struck-out portions cooperate with the hole to provide an axis inclined to the plane of the end section 74 and are provided with internal threads for engagement with the threads on the member 92. In this manner, the member is supported in convenient position for threaded adjustment.

What I claim is:

1. In a culinary utensil, in combination first and second stub shafts and first and second wheels, said shafts axially aligned and connected by a universal joint, the said first shaft being centrally and fixedly mounted in the said first wheel, the said second shaft being centrally and fixedly mounted in the said second wheel, a handle journaled on the first shaft between the wheels, a plate member journaled on the second shaft outwardly of said wheels and adjacent to said second wheel, means connected to said plate member and fulcrumed on said handle for swinging the second shaft and the second wheel to raised and lowered positions with respect to the first wheel, a floating plate journaled to the first shaft intermediate of the handle and the first wheel, said first wheel having a boss portion centrally thereof, said floating plate having a forward offset guide portion converging from its upright forward edge to a horizontal formation in advance of the boss and along a line approximately parallel to the tangent of the bottom of said boss, whereby the said means provides vertical arcuate movement of the second wheel for positioning its lower peripheral surface in spaced relation to the floating plate.

2. In a culinary utensil, in combination first and second stub shafts and first and second wheels, said shafts axially aligned and connected by a universal joint, the said first shaft being centrally and fixedly mounted in the said first wheel, the said second shaft being centrally and fixedly mounted in the said second wheel, a handle journaled on the first shaft between the wheels, a plate member journaled on the second shaft outwardly of said wheels and adjacent to said second wheel, means connected to said plate member and fulcrumed on said handle for swinging the second shaft and the second wheel to raised and lowered positions with respect to the first wheel, a floating plate journaled to the first shaft intermediate of the handle and the first wheel, said first wheel having a boss portion centrally thereof, said floating plate having a horizontal guide portion projecting along a line approximately parallel to the tangent to the bottom of said boss and offset in advance thereof, whereby the said means provides vertical arcuate movement of the second wheel for positioning its lower peripheral surface in spaced relation to the floating plate.

3. In a culinary utensil, in combination first and second wheels centrally mounted on first and second stub shafts respectively, the inner side wall of said first wheel having a centrally located boss portion with its periphery forming a bearing surface, a floating plate journaled on the first shaft while being depending therefrom adjacent said boss and having a horizontal guide portion projecting along a line approximately parallel to the tangent of the bottom of said boss, a handle journaled on the first shaft adjacent said floating plate, a plate member journaled on the second shaft outwardly and adjacent to the second wheel, means connected to said plate member and fulcrumed on the handle whereby said means enables moving the second wheel vertically in an arcuate movement for positioning its lower peripheral surface in spaced relation to said floating plate, the inner ends of said shafts axially aligned and operatively connected for enabling co-operative operation thereof with said means in said arcuate movement.

4. In a culinary utensil, in combination first and second wheels centrally mounted on first and second stub shafts respectively, the inner side wall of said first wheel having a centrally located boss portion with its periphery forming a bearing surface, a floating plate journaled on the first shaft while being depending therefrom adjacent said boss and having a horizontal guide portion projecting along a line approximately parallel to the tangent of the bottom of said boss and offset in advance thereof, a handle journaled on the first shaft adjacent said floating plate and extending rearwardly therefrom, the forward end of a plate member journaled on the second shaft outwardly and adjacent to the second wheel and extending rearwardly therefrom, means connected to said plate member and fulcrumed on the handle whereby said means enables moving the second wheel vertically in an arcuate movement for positioning its lower peripheral surface in spaced relation to said floating plate, the inner ends of said shafts axially aligned and operatively connected for enabling co-operative operation thereof with said means in said arcuate movement.

5. In a culinary utensil, in combnation first and second wheels centrally mounted on first and second stub shafts respectively, the inner side wall of said first wheel having a centrally located boss portion with its periphery forming a bearing surface, a floating plate journaled on the first shaft while being depending therefrom adjacent said boss and having a forward offset guide portion converging from its upright forward edge to a horizontal formation in advance of the boss and along a line approximately parallel to the tangent of the bottom of said boss, a handle journaled on the first shaft adjacent said floating plate and extending rearwardly therefrom, the forward end of a plate member journaled on the second shaft outwardly and adjacent to the second wheel and extending rearwardly therefrom, means connected to said plate member and fulcrumed on the handle whereby said means enables moving the second wheel vertically in an arcuate movement for positioning its lower peripheral surface in spaced relation to said floating plate, the inner ends of said shafts axially aligned and operatively connected for enabling co-operative operation thereof with said means in said arcuate movement.

References Cited in the file of this patent

UNITED STATES PATENTS

| Number | Name | Date |
|---|---|---|
| 719,043 | Reminger | Jan. 27, 1903 |
| 1,326,260 | Hardebeck | Dec. 30, 1919 |
| 1,375,044 | Follick | Apr. 19, 1921 |
| 1,530,279 | Minneman | Mar. 17, 1925 |
| 1,965,985 | Morgan | July 10, 1934 |
| 2,487,203 | Wilber | Nov. 8, 1949 |